United States Patent [19]

Marie et al.

[11] 3,882,454

[45] May 6, 1975

[54] METHODS OF DIFFERENTIATING IMAGES AND OF RECOGNIZING SHAPES AND CHARACTERS, UTILIZING AN OPTICAL IMAGE RELAY

[75] Inventors: Gerard Marie, L'Hay-les-Roses; Jacques Donjon, Yerres; Jean-Pierre Hazan, Saint-Maur; Michel Grenot, Brunoy, all of France

[73] Assignee: U.S. Philips Corporation, New York, N.Y.

[22] Filed: Feb. 2, 1973

[21] Appl. No.: 329,236

[30] Foreign Application Priority Data

Feb. 3, 1972 France ............................ 72.03620

[52] U.S. Cl. ................. 340/146.3 Q, 250/213 VT, 340/146.3 F; 350/150; 350/162 SF

[51] Int. Cl. ............................................ H01j 39/12

[58] Field of Search ............ 235/181, 182; 350/150, 350/151, 157, 162 SF, 54; 178/6.8; 356/163; 328/121; 340/146.3 Q, 146.3 F; 250/213 VT

[56] References Cited

UNITED STATES PATENTS

| | | | |
|---|---|---|---|
| 3,593,286 | 7/1971 | Altman | 340/146.3 Q |
| 3,662,104 | 5/1972 | Nordseth et al. | 178/6.8 |
| 3,666,359 | 5/1972 | Lee | 340/146.3 P |
| 3,754,144 | 8/1973 | Caruso | 350/150 X |
| 3,792,259 | 2/1974 | Donjon et al. | 250/213 VT |

FOREIGN PATENTS OR APPLICATIONS

| | | | |
|---|---|---|---|
| 1,166,731 | 10/1969 | United Kingdom | 350/162 SF |

OTHER PUBLICATIONS

Lowenthal et al., "Progrès Récents en Optique Cohérente: Filtrage des Fréquences Spatiales, Holographie," Revue D'Optique, 1/1967, pp. 51–59.

*Primary Examiner*—Gareth D. Shaw
*Assistant Examiner*—Leo H. Boudreau
*Attorney, Agent, or Firm*—Frank R. Trifari; Simon L. Cohen

[57] ABSTRACT

The differentiation of an image is achieved by utilizing an optical relay, comprising a plate of an electrooptic material which is brought to a temperature approximating its Curie point, and which as a variable birefringe.

The subtraction is effected of images which are projected on the relay, the images corresponding to the initial image but being shifted over a small distance, the birefringe induced by the images being equal, in absolute value and their signs being opposed.

Application: recognition of shapes and characters.

8 Claims, 10 Drawing Figures

METHODS OF DIFFERENTIATING IMAGES AND OF RECOGNIZING SHAPES AND CHARACTERS, UTILIZING AN OPTICAL IMAGE RELAY

The present invention relates to methods of differentiating images by means of an electrooptic device as described in the French patent application No. 71.11319, dated Mar. 31st, 1971, corresponding to U.S. Pat. No. 3,792,259, filed Mar. 28, 1972, in the name of Applicant, said device comprising: at least one first source providing a first light radiation, means for projecting the said radiation, at least one second source providing a second light radiation, means for polarizing and projecting said second light radiation, and an optical image relay which is formed by a vacuum enclosure having at least one window which is transparent to light radiation, a layer which is photosensitive to a first radiation, an electrooptic plate whose temperature is brought to about its Curie point and which provides a birefringence which is variable as a function of the potential difference existing between its faces, a first electrically conductive electrode which is arranged on the said plate and optically transparent to a second light radiation a second electrode being placed at the opposite side in the vicinity of the said plate, means being provided for modulating the said first light radiation before it is incident on the said photosensitive layer, the said electrodes being connected to a DC voltage source.

The invention also relates to methods of recognizing shapes and characters utilizing the said methods of deriving images.

The said patent application also describes a method of subtracting, by means of this electrooptic device, two series of images which are successively projected on the photosensitive layer, by applying a first DC voltage between the two said electrodes during the projection of the first series of images, and a second DC voltage, having an polarity which opposes that of the first DC voltage, during the projection of the second series; however, the method of differentiating images by means of this device is not described.

According to the present state of the art there are methods of differentiating images.

One method, for example, consists in the differentiation of an electric signal which necessitates a television type analysis of the image, and the reconstruction of this image accompanied by the deterioration inherent in these operations: loss of resolution, contrast, signal-to-noise ratio, etc.

According to another method, the differentiation is obtained by filtering the Fourier transform of the image by means of a filter whose transmission is proportional to the square of the spatial frequency $\Omega$; this method involves difficulties in realizing the filter and its positioning which must be done with a precision in the order of a few microns.

With respect to the methods according to the present state of the art, the method according to the invention offers the advantage that it can be very readily put into use and controlled, and in particular that no image analysis is required.

It is characterized in that it enables the differentiation of an initial image by subtraction of two series of images which comprise one image each, or the sum of a plurality of images corresponding to the initial image, but which differ among each other by a transformation which may be a translation of small amplitude, a rotation of small amplitude, or a slightly different magnification. In this manner various derivatives of an image can be obtained, in particular the first and second derivatives with respect to a direction which is defined by the vector $\vec{u}$, the first and second radial and azimuthal derivatives, and a second derivative which is independent of any direction, i.e. the Laplace transform of the initial image.

The invention also resides in the enhancement of the contours of an image by subtracting an image which has been subjected to a second differentiation of the initial image, and also in the combination of the various treatment processes stated above.

The invention is extended to the use of the described differentiation methods for the recognition of characters and shapes by optical means utilizing complex spatial filtering (amplitude and phase).

Methods of optical recognition of an object which is formed by a character or a shape, are known and are described in numerous articles such as that by Messrs. S. Lowenthal and Y. Belvaux: Progrès récents en optique cohérente — filtrage des fréquences spatiales — holographie — Revue d'Optique No. 1, January 1967, pages 1–64. An optical filter, in general a hologram of the object to be recognized, selects, in the spectrum of the spatial frequencies of an image comprising the said object, the components which relate to this object and to which an inverse Fourier transform is made to correspond by correlation of a light signal in the plane of correlation.

The fact that the filter, in the form of a hologram, comprises information concerning amplitude and phase, enables the detection of not only the presence or absence of the object to be recognized, but also of its position in the image. In this manner, for example, the position(s) of a character in a line or on a page can be recognized.

According to the present invention, the recognition of an object in an image is effected by correlation by means of a hologram filter which is arranged in the plane of the Fourier transform of the image, the image to be filtered and the model of the object to be recognized which is used for realizing the filter being both derived according to one of the above methods.

According to the present invention, the recognition of an object in an image is also achieved by correlation by means of a hologram filter which is arranged in the plane of the Fourier transform of the image, the image to be filtered not being differentiated, and the model of the object to be recognized, used for realizing the filter, being submitted to a second differentiation.

The invention will be better understood on the basis of the following description which is given by way of example with reference to the figures.

Figure 1:
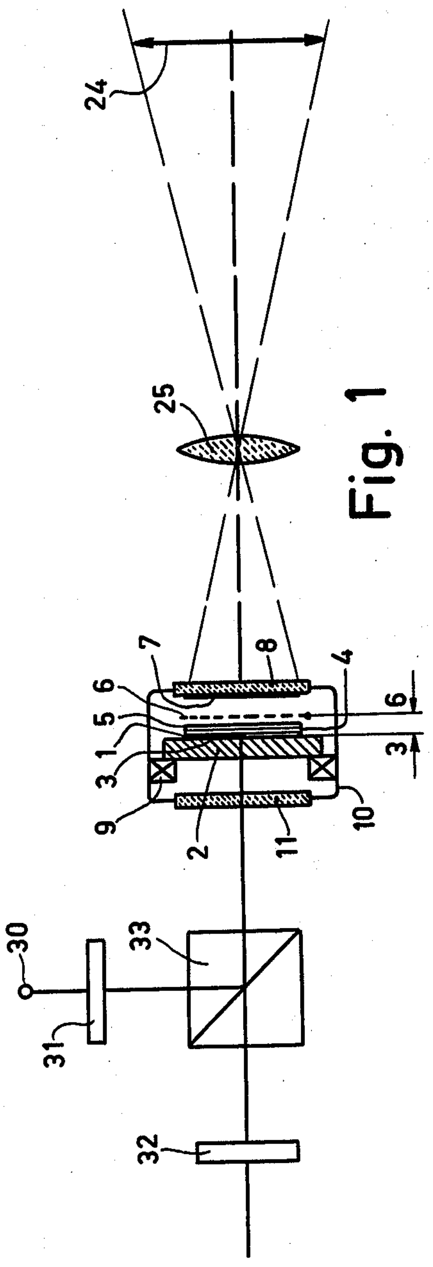
FIG. 1 shows a first embodiment of the device in which the photosensitive layer is a photocathode on which an image is projected.

FIG. 1 shows a device according to the cited patent application. The optical image relay is contained in a vacuum enclosure 10 which comprises two windows, 8 and 11, respectively. These windows can be transparent to radiation of different wavelengths. Arranged on the window 8 is a photocathode 7. Opposite the photocathode 7 is the plate 1 of variable birefringe which may be a monocrystal of potassium-deuterated phosphate diacide. This plate is covered with an insulating mirror 4 and a secondary-emissive layer 5, of with a maximum secondary-emission coefficient of greater than 1.

Arranged between the photocathode 7 and the layer 5 is a grid 6 at a distance of some tens of microns therefrom. The other surface of the plate 1 is covered with a transparent conductive layer 3 and is glued onto a transparent support 2, for example, made of calcium or barium fluoride, which is isotropic and, has good thermal conductivity. The plate 1 is brought to a temperature in the vicinity of its Curie point by means of a cooling member 9. The images 24 is projected onto the photocathode 7 by means of an objective 25.

A direct voltage, positive or negative, is applied between the transparent conductive layer 3 and the grid 6. The operation of the optical relay is not symmetrical with polarity. When the grid 6 is negative with respect to the target, the secondary emission coefficient of the layer 5 is very low and the deposited charges are negative and substantially equal to the number of electrons emitted by the photocathode 7 under the influence of the light provided by the image 24. When the grid 6 is positive with respect to the target, the secondary emission coefficient $\eta$ of the layer 5 is larger than 1, and for the sake of simplicity it can be assumed that the charges deposited on the bombarded surface are positive charges proportional to $(\eta - 1)$.

As long as the potential differences between the two faces of the plate are smaller than the direct voltage applied between the two electrodes 3 and 6, the electric charges deposited in each point are proportional to the product of the luminous flux arriving at this point and the exposure time.

The information stored in the optical relay is read by observation of the plate or by projection of the image of this plate by using a light beam provided by a source 30 which passes through a polarizer 31, is reflected by a dielectric mirror 4, and passes through the analyzer 32, the separator 33 directing the incident and reflected beams. When this separator 33 is of the polarizing type, it also acts as the elements 31 and 32. It is known that the image thus obtained, the luminescence of which depends only on the power of the source 30, can be projected onto a screen having large dimensions. It is also known that the source 30 can be a source of coherent light (laser) and that in this manner a Fourier transform of the image can be realized by means of an objective which is not shown in the Figure. The recognition of an object in the image can then be performed by correlation by filtering this Fourier transform by means of a hologram filter which is realized on the basis of a model of the object to be recognized.

Figure 2:
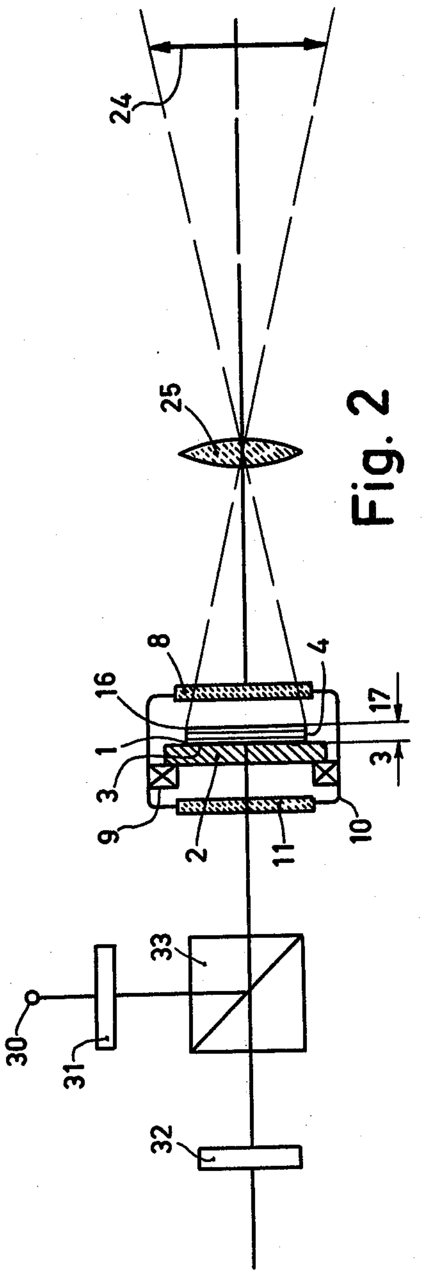
FIG. 2 shows a second embodiment of the device in which the photosensitive layer is a photoconductive layer on which an image is projected.

In FIG. 2, the elements which are identical to those of FIG. 1 are denoted by the same references. The photosensitive element is formed by a photoconductive layer 16 which is deposited on the insulating mirror 4. The photoconductive layer is covered with a conductive layer 17 which is transparent to the radiation from the image 24. The direct voltage is applied between the two transparent conductive layers 3 and 17. The incidence of the luminous flux on the photoconductor 16 creates electron-hole-pairs which modify the state of the charge of the plate on the side of the mirror, as in case of FIG. 1; as long as the potential differences between the two faces of the plate 1 are less than the direct voltage applied between the two electrodes 3 and 17, the electric charges deposited in each point are proportional to the product of the luminous flux arriving at this point and the exposure time.

For the description of the method, we will occasionally assume the objects to have a single dimension according to a coordinate axis $x$. It is obvious that the method relates to objects having two dimensions, according to the rectangular coordinates $x$ and $y$; the location of the objects can thus be defined either by their absciss $x$ and their ordinate $y$, or by their polar coordinates: radial distance $r$ and azimuth $\Theta$.

In order to illustrate the importance of the invention, we will start by describing the advantage of the differentiation in the recognition methods by correlation of an object in an image. Assume that there are two signals having a single dimension $f(x)$ and $g(x)$. The expression of the correlation product of those signals is:

$$f(x) \otimes g^*(-x) = \int_{-\infty}^{+\infty} f(\xi)\, g^*(\xi - x)\, d\xi,$$

where $\otimes$ symbolizes the convolution product, and $g$ the conjugated function of g.

Figure 3:
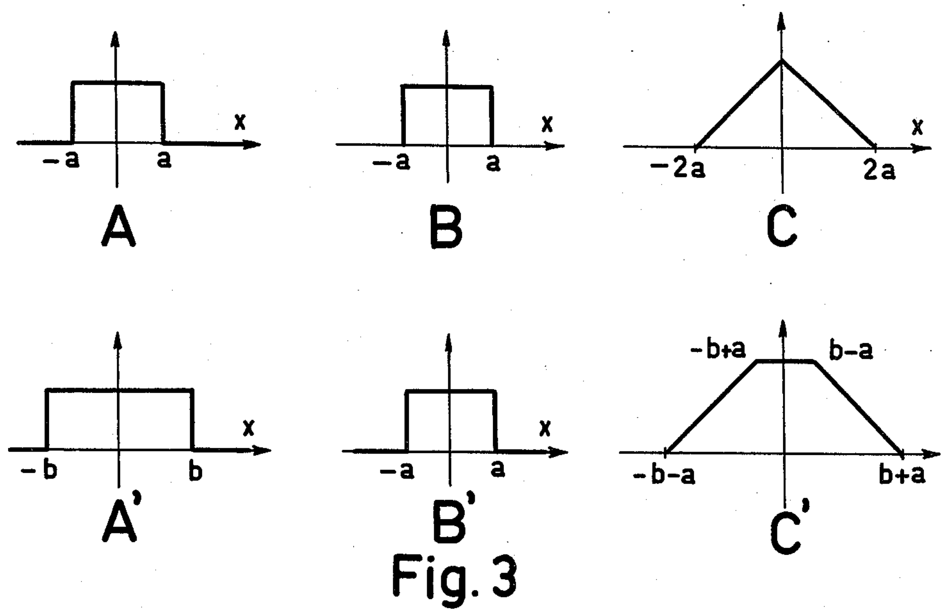
FIG. 3 shows a signal, noise and their correlation products obtained by a filter formed by the signal.

FIG. 3 shows the case of a squarewave signal $f(x)$ and a squarewave parasitic signal $(g)x$, the widths of which are $2a$ and $2b$, respectively, and the result of them after filtering, in the plane of their Fourier transforms, by means of a hologram filter realized on the basis of the signal. Represented in A and A' are $f(x)$ and $g(x)$, respectively, in B and B' the filter identical to $f(x)$, while in C and C' the response of $f(x)$ and $g(x)$, respectively, to the filter are shown. In this Figure, as in the following figures, the ordinates are not defined and can represent luminescence, electric charges, induced birefringes, or any other value relating thereto. The result of filtering the signal, equal to the autocorrelation function of this signal, i.e. to the convolution product $f(x) \otimes f^*(-x)$, has the shape of an isosceles triangle having a base equal to 4a; the result of filtering the parasitic signal, equal to the correlation function of the signal and of the parasitic signal, i.e. of the convolution product $g(x) \otimes f^*(-x)$, has the shape of an isosceles trapezoid having a base equal to 2 ($a+b$). It appears that it is difficult to distinguish the result of filtering the signal from that of the parasitic signal; in particular, when $b$ is larger than $a$, the filtered output in response to the parasitic signal is more perceptible than the response to the signal.

Figure 4:
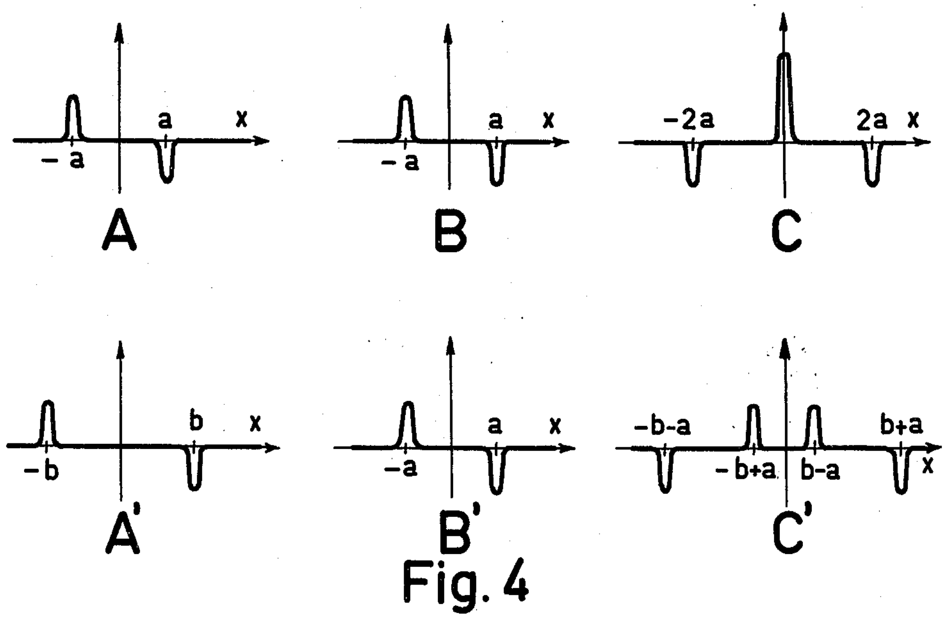
FIG. 4 shows the first derivatives of the signal and of the noise and their correlation products obtained by a filter formed by the first derivative of the signal.
Figure 5:
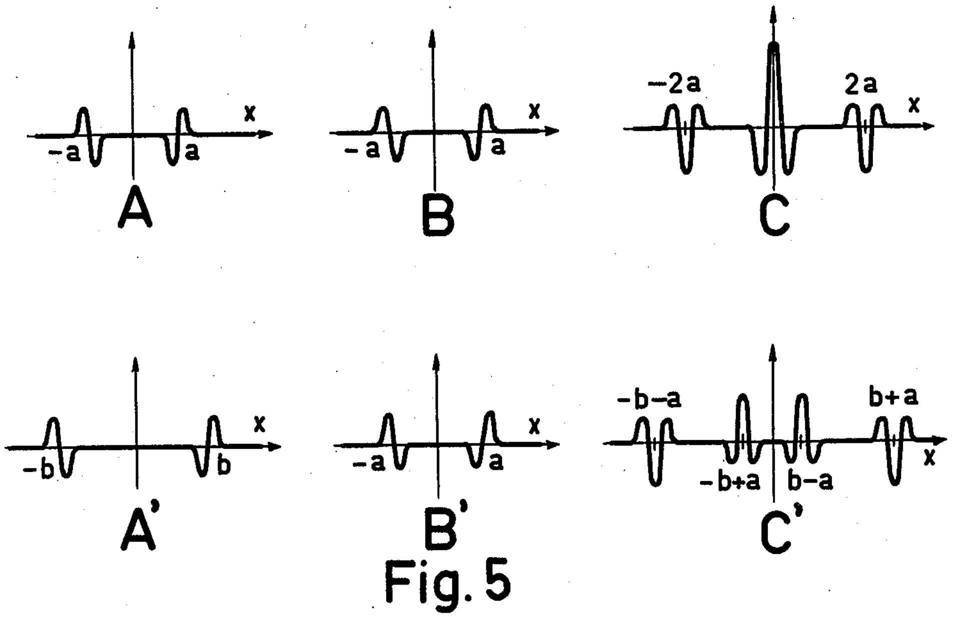
FIG. 5 shows the second derivatives of the signal and of the noise and their correlation products obtained by a filter formed by the second derivative of the signal.

A substantial improvement of the ratio of signal versus parasitic signal is obtained, as indicated in the article, when the correlations are performed with the derivatives of the signal and the parasitic signal. FIG. 4 shows, in C and C', the responses obtained when use is made of the first derivatives, and FIG. 5 shows, in C and C', the reactions obtained when use is made of the second derivatives; it is to be noted that these figures show, in AB and A'B', the derivatives of the signals corresponding to those represented in AB and A'B' in FIG. 3. It appears that only the autocorrelation C of a derivative of the signal then gives a centered component and that the amplitude of this component is much larger than that of the (non-centered) components given by the correlation C' of a derivative of the parasitic signal by a derivative of the same order of the signal.

Figure 6:
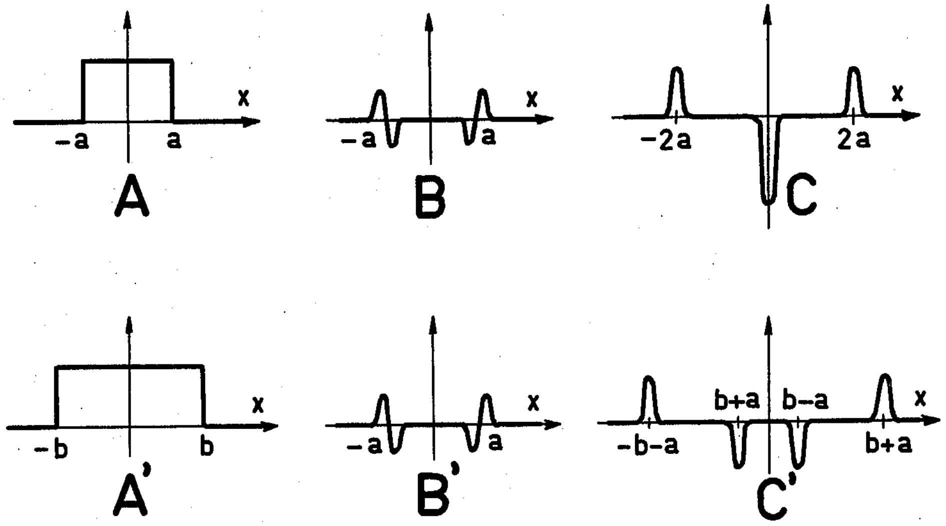
FIG. 6 shows the signal, the noise and their correlation products obtained by a filter formed by the second derivative of the signal.

In FIG. 6, where as previously the sequence ABC is relative to the filtering of $f(x)$ and A',B'C' is relative to the filtering of $g(x)$, the case is shown where the correlation is performed between the signal $f(x)$, represented in A, or the parasitic signal $g(x)$, represented in A', non-differentiated and the second derivative of the signal, $f''(x)$, represented in B or B'. It appears that the reactions C and C' are identical as regards amplitude, but their sign is opposed to that obtained in C and C', FIG. 4, when the correlation between the first derivative of the signal $f'(x)$ or of the parasitic signal $g'(x)$ and the first derivative of the signal $f'(x)$ is effected. In order to improve the ratio of the signal to the parasitic signal by using the derivative, it is thus not necessary to differentiate the image to be filtered; it is simply sufficient, when realizing the filter, to use a model of the object to be recognized which has been subjected to a second differentiation.

This solution is advocated in the said article which, moreover, gives means to realize the differentiation of the filter by superimposing on a hologram filter of the object to be recognized, in the plane of the Fourier transform, a filter whose transmission is proportional to $(\Omega/\Omega_m)^2$, where $\Omega$ represents the spatial frequency and $\Omega_m$ the maximum spatial frequency used. As already stated, the realization of this supplementary filter is difficult and its positioning, which must be done with an accuracy of a few microns, is very delicate.

The invention eliminates these difficulties, because it enables the first or second derivatives of an image to be obtained directly.

According to the invention, a first differentiation of an initial image is realized by effecting, by means of the said optical image relay, the subtraction of two images which corresponding to the initial image but which differ from each other by a transformation which can be a translation of small amplitude, a rotation of small amplitude, or a slightly different magnification.

Figure 7:
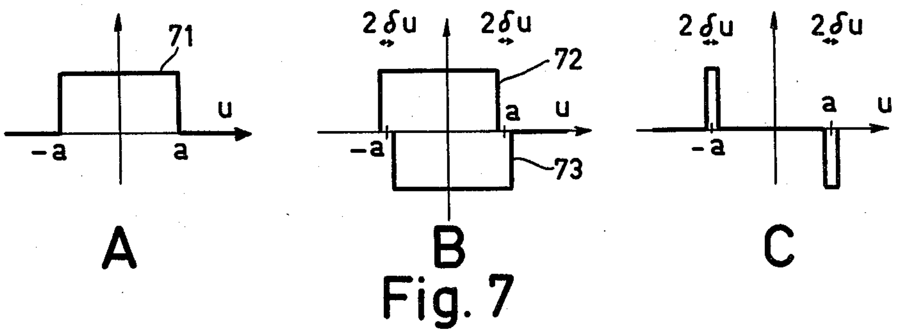
FIG. 7 shows a method of a first differentiation of an image in a given direction defined by the vector $\vec{u}$.

Let us consider an image having two dimensions which is defined by the cartesian coordinates, $x$ and $y$ or polar coordinates, $r$ and $\Theta$ of these points. Let us assume, in order to lay down the ideas, as indicated in A in FIG. 7, that the luminance profile of this image, according to a direction $\vec{u}$ of the plane $xy$, has the shape of the squarewave 71 of a width 2a. In C, FIG. 7 shows the result of the subtract operation, diagrammatically shown in B, of two images 72 and 73 which are shown in B, and which correspond to the initial image but which have been shifted, the one by a quantity $-\delta u$, small relative to a, and the other by a quantity $+\delta u$, along the direction $\vec{u}$, the image intensities and their exposure times being such that these images induce, in absolute value, the same birefringe. The images thus have the same "effective intensities".

When the quantity $\delta u$ tends towards 0, the difference obtained tends towards the first derivative of the image in the direction $\vec{u}$, which derivative can be written as follows, for all image points in the plane $xy$, by calling $v$ the variable $v(xy)$ which defines this image:

$$\frac{\delta v}{\delta u} = \vec{u} \cdot \overrightarrow{\text{grad } v} \quad (1)$$

in which $\vec{u}$ represents, in the right hand side, the unit vector in the direction $\vec{u}$.

Because the luminous energy contained in the difference is proportional to $\delta u$, this quantity cannot be infinitely small. In practice it will be chosen to be smaller than or in the order of the usable elementary resolution limit. The operation performed, consequently, will not be a mathematically perfect differentiation but a physical differentiation which is valid for a spatial frequency spectrum extending between 0 and $\Omega_m$, in which $\Omega_m$ is inversely proportional to $\delta u$. However, it can be noted that all physical methods of differentiation and in particular the two said methods (differentiation of an electric signal and filtering in the plane of the Fourier transform) are valid only up to a given frequency limit. We therefore feel justified in talking about differantiation methods, even in the case where the quantity $\delta u$ is not zero.

Figure 8:
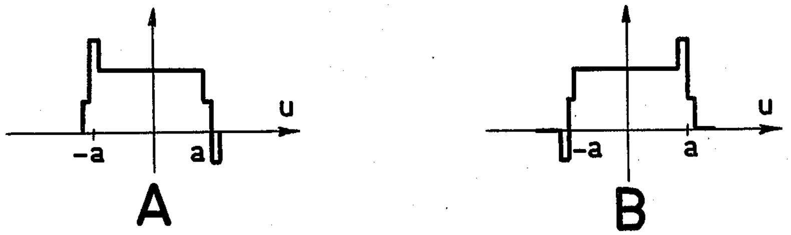
FIG. 8 shows methods of first partial differentiation of an image in a given direction which is defined by the vector $\vec{u}$.

It is to be noted that the first derivation according to a direction $\vec{u}$ causes disappearance of the information representing a gradient perpendicular to $\vec{u}$, as is obvious from the formula (1). In order not to loose this information completely, only a partial first differentiation can be performed by adding, or by subtracting a differentiated image to or from the initial image, as is shown in A and B in FIG. 8, respectively, the relationship between the amplitudes of the images enabling dosing as a function of the relevant importance of the information in the directions parallel and perpendicular to $\vec{u}$. In practice this operation of addition or subtraction can be combined with the subtract operation which enables the differentiation to the effected such that only one single subtract operation must be performed. For example, it is sufficient to subtract two images of different amplitude.

It is not possible to perform a first differentiation of the image without loosing information in a given direction. In particular, it is obvious from formula (1) that the sum of various derivatives according to the directions $\vec{u_1}$, $\vec{u_2}$ . . . etc. equivalent to a single derivative in a direction corresponding to the sum of the vectors $\vec{u_1}$, $\vec{u_2}$ etc.; in fact, one may write:

$$\sum_K (\vec{U_K} \cdot \overrightarrow{\text{grad}}\ v) = (\sum_K \vec{U_K}) \cdot \text{grad } v.$$

In given applications involving the recognition of shapes, it is often the radial information or, conversely, the azimuthal information which is most important. The methods according to the invention enable radial or azimuthal first differentiations to be performed in order to emphasize the corresponding information. So as to obtain a radial first derivative, it is sufficient to perform the subtraction of two images which correspond to the initial image but whose magnification, with respect to that of the initial image, is $(1 + \delta G)$ and $(1 - \delta G)$, respectively. In order to obtain a first azimuthal derivative, it is sufficient to subtract two images which correspond to the initial image but which have been subjected, with respect to the initial image, to rotations through angles $+\delta\Theta$ and $-\delta\Theta$, respectively.

When the quantities $\delta G$ and $\delta\Theta$ tend towards 0, the differences obtained tend towards the derivatives of the image $v(r, \Theta)$; these derivatives can be written, as a function of the polar coordinates $r$ and $\Theta$, as:

for the first radial derivative $$r\frac{\delta v}{\delta r} = \vec{r}\ \overrightarrow{\text{grad } v} \qquad (2)$$

and for the first azimuthal derivative $$\frac{\delta v}{\delta\Theta} = \left| \vec{r} \wedge \overrightarrow{\text{grad } v} \right| . \qquad (3)$$

The expressions (2) and (3) show that the first radial derivative causes disappearance of the information representing a azimuthal gradient, and that the azimuthal derivative makes the information representing a radial gradient disappear. As in the case of the first derivative according to a direction $\vec{u}$, it is obvious that a combination of these two derivatives would cause disappearance of the information representing a gradient tangential to a family of spirals, the shape of which would depend on the mode of combination of the two derivatives.

So as not to loose any information, it is possible, however, as in the case of the first differentiation in a direction $\vec{u}$, to perform only a partial radial or azimuthal differentiation, by adding or subtracting a differentiated image to or from the intial image, the relationship between the amplitudes of the images enabling dosing as a function of the relevant importance of the information in the radial and azimuthal directions. It is to be noted that, as previously, this addition or subtraction can be simultaneously effected with the subtraction enabling the differentiation to be performed.

It was already demonstrated that for the recognition of an object in the image it would be advantageous to perform the correlation between this nondifferentiated image and the second derivative of the object to be recognized (FIG. 6). The invention enables a second derivative of this object to be recognized to be performed directly, and to realize the hologram filter of this differentiated object in this manner.

According to the invention, a second differentiation of an initial image is realized, by means of the said optical image relay, by subtracting an image which is identical to the initial image from a sum of images resembling the initial image but differing therefrom by transformations which can be translations of small amplitude, rotations of small amplitude, or slightly different magnifications.

Figure 9:
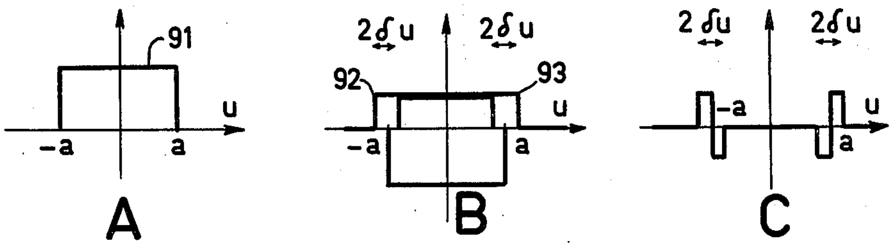
FIG. 9 shows method of a second differentiation of an image in a given direction which is defined by the vector $\vec{u}$.

Let us consider an image having two dimensions which is defined by the cartesian coordinates, $x$ and $y$, or polar coordinates, $r$ and $\Theta$, of these points. Let us assume that the luminance profile of this image, according to a direction $\vec{u}$ of the plane $xy$, has the shape of a squarewave having a width $2a$. FIG. 9 shows in C the result of the subtract operation, diagrammatically shown in B, of an image identical to the initial image 91 which is shown in A, from a sum of two images 92 and 93 which resemble the initial image but which are shifted by the quantities $-\delta u$ and $+\delta u$, respectively, according to the direction $\vec{u}$, the intensity of each of these two images and their exposure times being such that the birefringe induced by each is the average, in absolute value of that induced by the subtracted image.

When the quantity $\delta u$ tends towards 0, the result of the operation tends towards the second derivative of the image, according to the direction $\vec{u}$, which derivative can be written for all points of the image in the plane $xy$ as:

$$\frac{\delta^2 v}{\delta u^2} .$$

In practice, $\delta u$ is a finite quantity, and the operation performed is a physical differentiation which is valid up to a spatial frequency $\Omega_m$, inversely proportional to $\Omega u$.

The second differentiation according to the direction $\vec{u}$ causes disappearance of the information which gives a differentiated signal in only one direction which is perpendicular to $\vec{u}$. However, contrary to the case of the first differentiation, it is now possible to perform a second differentiation, independent of any direction, i.e. the Laplace transform of the image can be obtained which is written as:

$$\Delta v = \frac{\delta^2 v}{x^2} + \frac{\delta^2 v}{y^2} \qquad (5)$$

It can be attempted to obtain this Laplace transform by producing the sum of two second derivatives in two perpendicular directions, for example, $x$ and $y$, i.e. by reducing an image which is identical to the initial image by a sum of four images which correspond to the initial image but which are translated according to the vectors $\vec{u_1}$, $\vec{u_2}$, $\vec{u_3}$ and $\vec{u_4}$, respectively, these four vectors having the same module $\delta u$ and being angularly shifted 90° each with respect to the preceding one, the birefringe induced by each of the four images being the same, in absolute value, to one quarter of that induced by the subtracted image. In fact, the result of this operation only represents an approximation of the Laplace transform. In fact, if the operation is performed on a circular image, positive and negative squarewaves are obtained according to the directions $x$ and $y$, as shown in the FIG. 9, which have a width $\delta u$ and an amplitude A, while in the directions at an angle of 45° with respect to the axes, this squarewaves will have a width which is equal to:

$$\frac{\delta u}{\sqrt{2}} \qquad (4)$$

and an amplitude which is equal to 2A.

In order to obtain the Laplace transform of the image, it is sufficient to reduce an image which is identical to the initial image by a continuous sum of images which are translated according to a vector $\vec{u}$ with respect to the initial image, this vector $\vec{u}$ turning 360° at a uniform speed during the projection, the intensity of the images and the overall projection time being such that the birefringe induced by this continuous sum is equal, in absolute value to that induced by the reduced image.

More in general, an image which is identical to the initial image can be reduced by a sum of $n$ images which resemble the initial image but which are translated according to vectors $\vec{u_1} \ldots \vec{u_n}$ of the same absolute value $\delta u$, each of these vectors being angularly shifted over 360°/$n$ with respect to the preceding one, the birefringe induced by each of these images being equal to $1/n$ times that induced by the subtracted image. When $n$ is infinite, as above, the Laplace transform is obtained. When $n$ is finite, the result obtained is closer to the Laplace transform as $n$ is larger. In general, a value of $n$ equal to 4 or even 3 is acceptable. For $n = 2$, the second derivative with respect to a single direction is obtained.

For given applications where the radial information or, conversely, the azimuthal information is most important, a radial or azimuthal second differentiation may be desired. According to the invention, a radial derivative of an initial image is obtained by reducing an image identical to the initial image by a sum of two images which correspond to the initial image, but which have a magnification $(1 + \delta G)$ and $(1 - \delta G)$, respectively, with respect to the initial image. Also according to the invention, an azimuthal derivative of an initial image is obtained by reducing an image which is identical to the initial image by a sum of two images which resemble the initial image but which have been subjected to rotations through angles of $+\delta\Theta$ and $-\delta\Theta$, respectively, with respect to the initial image.

When the quantities $\delta G$ and $\delta\Theta$ tend towards 0, the results of the above operations tend towards the radial and azimuthal second differentiations of the image, which can be written as a function of the polar coordinates $r$ and $\Theta$ as follows:

for the radial second derivative $$r \frac{\delta^2 v}{\delta r^2}. \quad (6)$$

and for the azimuthal second derivative $$\frac{\delta^2 v}{\delta \Theta^2} \quad (7)$$

It is to be noted that for a given image detail, for example, an standard loop, the first (formulas 2 and 3) and second (formulas 6 and 7) radial and azimuthal derivatives five a reaction which is proportional to the distance $r$ from the point at the center of the coordinates, which center, however, does not necessarily coincide with the center of the image. Consequently, they are of interest because particularly the peripheral details determine the importance. When in this case no details representing a radial or azimuthal gradient are to be lost, the sum of the two preceding second derivatives can be obtained by reducing an image which is identical to the initial image by a sum of four images, two of which have the magnification $(1 + \delta G)$ and $(1 - \delta G)$, the two other ones being subjected to rotations $+\delta\Theta$ and $-\delta\Theta$, the birefringe induced by each of these four images being equal, in absolute value to one quarter of that induced by the subtracted image.

When $\delta G$ and $\delta\Theta$ tend towards 0, the result of this operation tends to a value which is approximated by the expression:

$$r \frac{\delta^2 v}{\delta r^2} + \frac{\delta^2 v}{\delta \Theta^2} = |r| \cdot \Delta v, \quad (8)$$

the approximation being of the same order of magnitude as that producing the Laplace transform by reduction of an image by a sum of four images.

Figure 10:
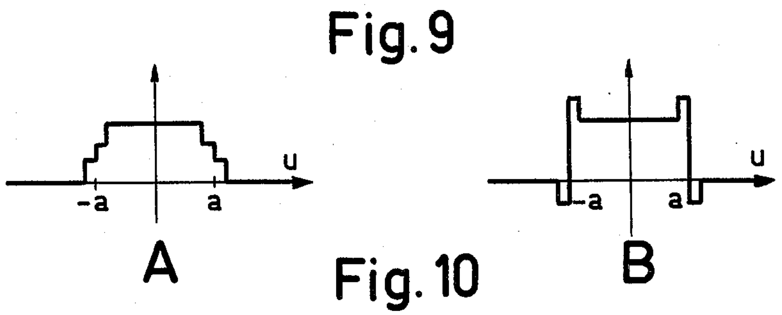
FIG. 10 shows methods of second partial differentiation of an image in a given direction which is defined by the vector $\vec{u}$.

In many applications not a complete second derivative is desired, but a partial second derivative. This can be obtained by adding or by cutting off an image differentiated according to one of the preceding methods to or from the initial image. It can be readily seen that only the subtraction of the second derivative results in the enhancement of the contours. This can be readily taken into account in the case of a second derivative according to a direction $\vec{u}$ in FIG. 10 where the sum and the difference of the image signal and the signal of the second derivative of the said image are represented in A and B, respectively. It is to be noted that, as previously in the case of the first derivative, this subtraction can be effected simultaneously with the subtraction which allows the differentiation to be performed. For example, an enhancement of the contours of an image can be obtained independent of the distance from the center of the coordinates by reducing an image which is identical to the initial image by a sum of $n$ images which resemble the initial image but which are translated according to vectors $\vec{u_1}, \ldots \vec{u_n}$, of the same absolute value $\delta u$, each of these vectors being angularly shifted 360°/$n$ with respect to the preceding one, the birefringe induced by each of these $n$ images being less than $1/n$ times that induced by the initial image.

A similar operation can be effected in the case where an enhancement of the contours is desired which is proportional to the distance from the center of the coordinates, by subtraction of the radial second derivative, of the azimuthal second derivative, or of the two derivatives simultaneously.

It can be noted that the images which are subjected to a first or second differentiation complete or partial, have a frequency spectrum which is much larger than that of the initial image. This property can give rise to problems and can in particular cause a deterioration of the signal-to-noise ratio when the useful details in an image are already at the limit of the resolution of the optical image relay used in the preceding operations. According to the invention, these difficulties are counteracted, in the case of recognition of shapes and characters, by correlation with the aid of a hologram filter which is arranged in the plane of the Fourier transform of the image and, when only the model of the object to be recognized has been subjected to a second differentiation complete or partial, according to one of the previously described methods, by using, during the realization of the filter, a model of the object which has been enlarged at a ratio G and an objective having a focal length which is equal to G times that of the objective used during the filtering of the image. In fact, because of the enlargement the spatial frequencies of the model of the object are reduced at a ratio equal to G, which can be between 2 and 6, for example, and there will no longer be any problem as regards the resolution of the optical relay in performing a second differentiation from this model of the object.

Without the objective being changed, a magnification G of the model of the object would result in a reduction at a ratio equal to G of the scale of the Fourier transform. In order to ensure that this conforms to that required during filtering, it is then sufficient to use, during the realization of the filter, an objective having a focal length G which is much larger than that of the objective used during the filtering of the image.

It can be noted that in the various described methods of differentiation, an image is reduced by a series comprising one image (in the case of the first derivative) or various images (in the case of the second derivative) by choosing the intensities and the exposure times of the different images such that the birefringes induced, in an opposed sense, by the series of images and by the subtracted image are equal in absolute value. In effect, one has to take in account a possible difference between the conversion efficiencies (light → electric charge) of the system in accordance with whether the charges are positive or negative.

We have seen, particularly, in the description of the operation of the device comprising a photocathode (FIG. 1), that the relationship between the conversion efficiencies (light → positive charge) and (light → negative charge) was close to $(\eta - 1)$, in which $\eta$ represents the secondary emission rate of the layer bombarded with primary electrons. Therefore, this relationship $(\eta - 1)$ must be found again between the luminances (product of the illumination and the exposure time) of the images or series of subtracted images.

In the case of the device comprising a photoconductor (FIG. 2), it is generally possible to obtain the same conversion efficiency in the two senses and, in this case, the luminance can be equal. However, a difference may occur in the sensitivity of the photoconductor in accordance with the direction of the applied electric field, for example, because of the asymmetry of the layers enclosing this photoconductor. In that case this asymmetry will have to be taken into account and luminances which differ according to the direction of the applied electric field must be chosen.

What is claimed is:

1. A method of optically differentiating images using an optic relay of the type wherein a second image projected on a photosensitive layer is subtracted from a first image projected on the photosensitive layer by reversing the polarity of an applied bias voltage during the projection of said second image, the method comprising projecting an image on the photosensitive layer, reversing the polarity of said applied bias voltage, incrementally shifting said image, projecting the incrementally shifted image with an effective intensity equal to $1/n$ times the absolute value of said first projected image, shifting the incrementally shifted image by an additional increment equal to said first increment, projecting said additionally shifted image on said photosensitive layer with an effective intensity equal to the effective intensity of said first incrementally shifted image, and repeatedly shifting and projecting said incrementally shifted images until a total of $n$ incrementally shifted images have been projected, whereby an approximation of a second derivative of said image is obtained.

2. A method as recited in claim 1, wherein the steps of incrementally shifting said image each comprise the step of incrementally rotating said image.

3. A method as recited in claim 1, further comprising the steps of resetting the polarity of the applied voltage to the conditions existing during the projection of the first image, and again projecting the first image on said photosensitive layer.

4. A method of optically differentiating images using an optic relay of the type wherein a second image projected on a photosensitive layer is subtracted from a first image projected on the photosensitive layer by reversing the polarity of an applied bias voltage during the projection of said second image, the method comprising projecting an image on the photosensitive layer, reversing the polarity of said applied bias voltage, first magnifying said image by a magnification slightly larger than 1, projecting said first magnified image on said photosensitive layer with an effective amplitude equal to one-half the effective amplitude of the first projected image, magnifying the first projected image by a magnification which is slightly smaller than 1, and projecting the last mentioned magnified image on the photosensitive layer with an effective amplitude equal to the effective amplitude of the first magnified image, the product of the two magnifications being approximately equal to 1.

5. A method of optically differentiating images using an optic relay of the type wherein a second image projected on a photosensitive layer is subtracted from a first image projected on the photosensitive layer by reversing the polarity of an applied bias voltage during the projection of said second image, the method comprising projecting an image on the photosensitive layer, reversing the polarity of said applied bias voltage, sequentially shifting and projecting $n$ images identical to said first projected image but each shifted by a small vector $\vec{u_1} \ldots \vec{u_n}$, the $n$ vectors having the same absolute value and being regularly angularly shifted with respect to each other over angles equal to $360°/n$, each of said $n$ images having an effective amplitude smaller than $1/n$ times the effective amplitude of said first image.

6. A method of optically differentiating images using an optic relay of the type wherein a second image projected on a photosensitive layer is subtracted from a first image projected on the photosensitive layer by reversing the polarity of an applied bias voltage during the projection of said second image, the method comprising projecting an image on the photosensitive layer, reversing the polarity of said applied bias voltage, incrementally shifting said image, projecting said incrementally shifted image on said photosensitive layer, whereby an approximation of the derivative of said image is obtained forming a hologram of the image information on the optic relay after all the previous steps have been performed, erasing the image information from the optic relay, projecting a different image on the optic relay, reversing the polarity of the applied bias voltage, performing the same steps of incrementally shifting and projecting said different image as were performed with the original image, and projecting the result onto said hologram.

7. A method as recited in claim 6, wherein said hologram is arranged in the Fourier transform plane of the image.

8. A method of optically differentiating images using an optic relay of the type wherein a second image projected on a photosensitive layer is subtracted from a first image projected on the photosensitive layer by reversing the polarity of an applied bias voltage during the projection of said second image, the method comprising projecting an image on the photosensitive layer, reversing the polarity of said applied bias voltage, incrementally shifting said image, projecting said incrementally shifted image on said photosensitive layer, whereby an approximation of the derivative of said image is obtained projecting the resultant image to a Fourier transform plane, forming a hologram of the projected image in the Fourier transform plane, erasing the image information from the optic relay, projecting a new image on the photosensitive layer of said optic relay, and projecting the new image from the optic relay to the hologram in the Fourier transform plane.

* * * * *

UNITED STATES PATENT AND TRADEMARK OFFICE

CERTIFICATE OF CORRECTION

PATENT NO. : 3,882,454

DATED : May 6, 1975

INVENTOR(S) : GERARD MARIE, JACQUES DONJON, JEAN-PIERRE HAZAN and MICHEL GRENOT

It is certified that error appears in the above-identified patent and that said Letters Patent are hereby corrected as shown below:

IN THE SPECIFICATION

Col. 3, line 36, "images" should be --image--;

Col. 4, line 47, "and g the" should be --and $g^*$ the--;

Col. 7, line 22, equation 2 should read:

$$--r \frac{\delta v}{\delta r} = \vec{r} \cdot \overrightarrow{\text{grad } v}--;$$

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*